(12) United States Patent
Christensen

(10) Patent No.: US 7,357,367 B1
(45) Date of Patent: Apr. 15, 2008

(54) EMBEDDED HIGH TEMPERATURE VALVE

(75) Inventor: Donald J. Christensen, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 397 days.

(21) Appl. No.: 11/116,163

(22) Filed: Apr. 21, 2005

Related U.S. Application Data

(60) Provisional application No. 60/565,571, filed on Apr. 26, 2004.

(51) Int. Cl.
  *F16K 31/12* (2006.01)
(52) U.S. Cl. .................. 251/30.05; 251/25; 251/30.02
(58) Field of Classification Search ............. 251/25, 251/30.01, 30.02, 30.05
  See application file for complete search history.

(56) References Cited

U.S. PATENT DOCUMENTS

| | | | |
|---|---|---|---|
| 4,363,309 A * | 12/1982 | Ludwig | ..................... 123/552 |
| 4,442,669 A * | 4/1984 | Burkes et al. | ................. 60/251 |
| 5,564,674 A * | 10/1996 | Kalin et al. | .................... 251/38 |
| 6,227,247 B1 * | 5/2001 | Abel | ..................... 137/625.62 |
| 6,290,203 B1 * | 9/2001 | Kolze | ...................... 251/30.03 |
| 6,926,036 B2 * | 8/2005 | Christensen | ............... 137/872 |

* cited by examiner

*Primary Examiner*—John K. Fristoe, Jr.
(74) *Attorney, Agent, or Firm*—Ingrassia Fisher & Lorenz

(57) ABSTRACT

A high temperature valve for controlling gas flow includes an outer vessel, a valve housing, and a valve element. The valve housing is disposed at least partially within, and is at least partially surrounded by, a propellant gas flow passageway that is formed in the outer vessel, and the valve element is disposed within the valve housing. Because the gas flow passageway at least partially surrounds the valve housing, when gas is supplied to the gas flow passageway a compressive force, rather than a tensile force, is exerted on the valve housings.

10 Claims, 4 Drawing Sheets

EMBEDDED HIGH TEMPERATURE VALVE

CROSS-REFERENCES TO RELATED APPLICATIONS

This application claims the benefit of U.S. Provisional Application No. 60/565,571, filed Apr. 26, 2004.

TECHNICAL FIELD

The present invention relates to rockets and missiles and, more particularly, to a valve that may be used to direct the flow of high temperature propellant gas in rockets and missiles.

BACKGROUND

Many rockets and missiles include one or more solid rocket motors to generate thrust to achieve and/or maintain flight, and/or to control in-flight direction. A solid rocket motor may include, for example, a motor case and a main nozzle. Typically, the motor case defines a combustion chamber, in which propellant is loaded and combusted to generate high-energy propellant gas. The main nozzle is typically in fluid communication with the combustion chamber and thus receives the high-energy propellant gas. The main nozzle may include a convergent inlet section, a divergent outlet section, and an interposing main nozzle throat. Propellant gas generated in the combustion chamber flows through the main nozzle, generating a thrust.

Solid rocket motors, such as the one briefly described above, are used in both strategic and tactical rockets and missiles. In general, strategic missiles are used for long duration missions, whereas tactical missiles are used for relatively short duration flight missions. Both types of missiles may be equipped with guidance control systems, which in many instances use attitude control valves to selectively divert a portion of the high-energy propellant gas away from the main nozzle to one or more peripheral nozzles, to thereby control missile attitude.

The attitude control valves that are used in guidance control systems, such as that described above, may be exposed to relatively high temperatures. For example, in some applications the propellant gas flowing through the valves may reach temperatures of up to 5,000° F. or higher. Thus, the attitude control valves in some missile and rocket applications, and most notably for strategic missiles and rockets, are constructed of relatively high-temperature materials, such as refractory metals.

Although attitude control valves constructed of high-temperature materials, such as refractory metals, operate safely, reliably, and robustly, these valves do exhibit certain drawbacks. For example, in most current applications the relatively high-temperature propellant gas flows into and through the control valves and exerts a tensile force on the valve. To assure the valve maintains sufficient material strength throughout the mission, the thickness of various portions of the valve may need to be increased. However, in many instances the high-temperature materials used to construct the attitude control valves often have relatively high densities. As a result, increasing the thickness of various portions of the valves can significantly increase the weight of the valve, and thus the overall weight of the rocket or missile, which can be highly undesirable.

Hence, there is a need for a valve that can withstand relatively high temperatures over a relatively long time period, without adversely impacting the weight of the system in which the valve is installed. The present invention addresses at least this need.

BRIEF SUMMARY

The present invention provides a valve that may be used to direct the flow of high temperature propellant gas in rockets and missiles, and most notably strategic rockets and missiles, without adversely impacting the overall weight of the rockets and missiles.

In one embodiment, and by way of example only, a high temperature valve for controlling propellant gas flow includes an outer vessel, a valve housing, and a valve element. The outer vessel has at least a propellant gas flow passageway formed therein that has at least an inlet port adapted to receive a flow of propellant gas. The valve housing is disposed at least partially within, and is at least partially surrounded by, the propellant gas flow passageway, and includes an inner surface, an outer surface, an inlet port, and an outlet port. The valve housing inner surface defines a control volume, the valve housing inlet port is in fluid communication with the propellant gas flow passageway and the control volume, and the valve housing outlet port is in fluid communication with the control volume. The valve element is disposed within the valve housing control volume and is moveable between at least an open position, in which the valve housing inlet and outlet ports are in fluid communication with one another, and a closed position, in which the valve housing inlet and outlet ports are not in fluid communication with one another.

Other independent features and advantages of the preferred valve will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or its application and uses. Furthermore, there is no intention to be bound by any theory presented in the preceding background or the following detailed description. In this regard, before proceeding with the detailed description, it will be appreciated that the present invention is not limited to use with a particular type or configuration of rocket motor, rocket, or missile, and it will be appreciated that the embodiments could also be used in conjunction with any one of numerous other systems, devices, or components that may be otherwise exposed to hot gas.

Figure 1:
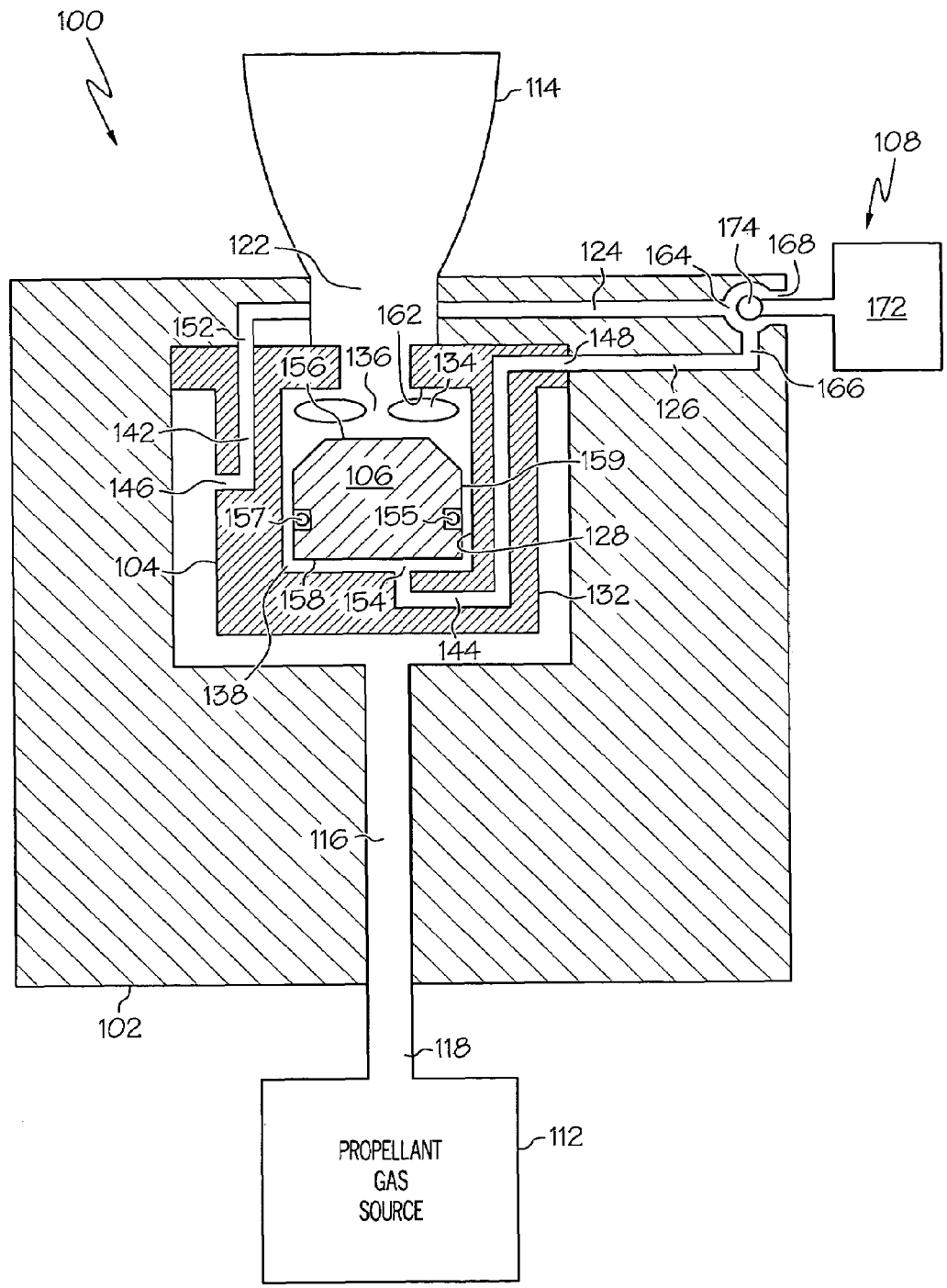
FIG. 1 is a simplified, schematic cross section view of an exemplary valve assembly according to an embodiment of the present invention.
Figure 2:
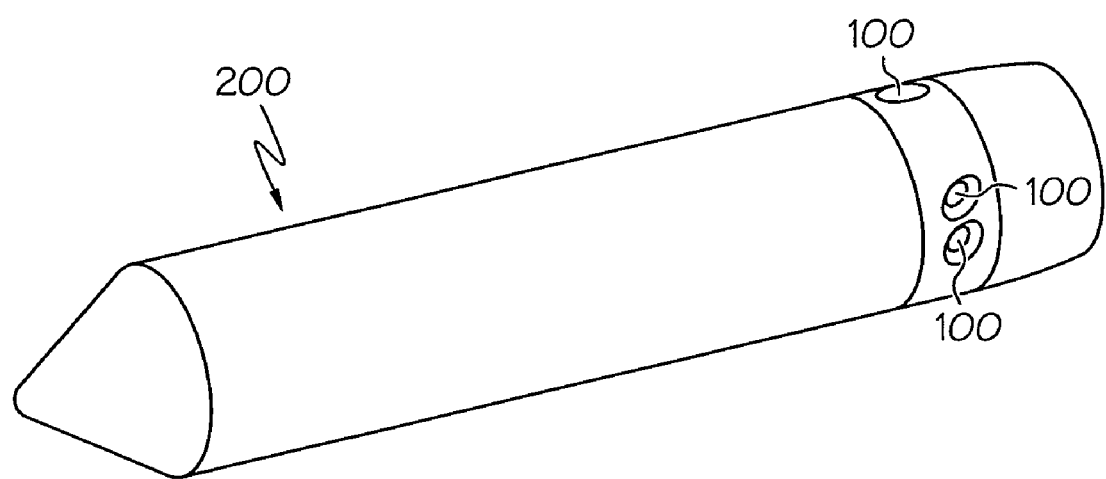
FIG. 2 is a perspective view of a missile that may use the valve assembly shown in FIG. 1.

Turning now to the description and with reference first to FIG. 1, a simplified cross section view of an embodiment of a valve assembly 100 is shown. The valve assembly 100 includes an outer vessel 102, a valve housing 104, a valve element 106, and a control valve 108, and is preferably used to control the flow of a propellant gas through, for example, one or more nozzles. As such, in the depicted embodiment the valve assembly 100 is coupled to receive propellant gas from a propellant gas source 112 and, as will be described more fully below, to selectively supply the propellant gas to a discharge nozzle 114. In such an implementation, the valve assembly 100 may be used to control the attitude of a missile, such as the exemplary missile 200 shown in FIG. 2, or any one of numerous other aircraft or spacecraft.

Returning once again to FIG. 1 it is seen that the outer vessel 102 has a propellant gas flow passageway 116 formed therein that includes an inlet port 118 and an outlet port 122. The inlet port 118 is coupled to receive a flow of propellant gas from the propellant gas source 112, and the outlet port 122 is coupled to the discharge nozzle 114. A control gas supply passage 124 and a control gas charge/discharge passage 126 are additionally formed through the outer vessel 102. The purpose of these passages 124, 126 are described in more detail further below.

The outer vessel 102 may be formed from any one of numerous suitable materials, or combination of materials, that are capable of withstanding the temperature of the propellant gas. In a particular preferred embodiment, the outer vessel 102 is implemented as part of the propellant gas source 112, which may be, for example, a rocket motor. In such an embodiment, as will be shown and described further below, the outer vessel 102 is constructed of a relatively lightweight, high temperature material such as, for example, graphite or carbon-carbon, which is at least partially surrounded by a relatively thin, light weight insulator material such as, for example, phenolic, which is in turn surrounded by a high strength material such as, for example, steel. It will be appreciated that these are merely exemplary materials and that any one of numerous other types of materials, or combinations of materials, may be used to implement the outer vessel 102.

The valve housing 104 is disposed at least partially within, and is at least partially surrounded by, the propellant gas flow passageway 116, and includes an inner surface 128, an outer surface 132, one or more inlet ports 134, and one or more outlet ports 136. The valve housing inner surface 128 defines a control volume 138 in which the valve element 106, which is described below, is disposed. The valve housing inlet ports 134 extend through the valve housing 104 between the inner 128 and outer 132 surfaces and, depending on the position of the valve element 106, selectively fluidly communicate the propellant gas flow passageway 116 with the control volume 138. The valve housing outlet port 136 is formed in the valve housing 104 and, depending on the position of the valve element 106, selectively fluidly communicates the control volume 138 with the discharge nozzle 114. It will be appreciated that, although the valve housing 104 is implemented with a plurality of inlet ports 134 and a single outlet port 136, the valve housing 104 could be implemented with a single inlet port 134 and/or a plurality of outlet ports 136.

As FIG. 1 also shows, a plurality of control gas passages 142, 144 are formed in the valve housing 104. In particular, a control gas supply passage 142 and a control gas charge/discharge passage 144 each extend through the valve housing 104, and each includes a first port 146 and 148, respectively, and a second port 152 and 154, respectively. The valve housing control gas supply passage first port 146 is in fluid communication with the propellant gas flow passageway 116 and the valve housing control gas supply passage second port 152 is in fluid communication with the outer vessel control gas supply passage 124. The valve housing control gas charge/discharge passage first port 148 is in fluid communication with the outer vessel control gas charge/discharge passage 126 and the valve housing control gas charge/discharge passage second port 154 is in fluid communication with the valve housing control volume 138. As will be described further below, the control gas supply 124, 142 and charge/discharge 126, 144 passages, in combination with the control valve 108, direct a portion of the propellant gas in a manner that causes the valve element 106 to move to a desired position.

The valve element 106, as was noted above, is disposed within the valve housing control volume 138, and is moveable between at least an open position and a closed position. In the depicted embodiment the valve element 106 is implemented as a piston or poppet valve and includes a first end face 156, a second end face 158, and an outer peripheral surface 159. The valve element 106 is disposed within the valve housing 104 such that the first end face 156, which has a cross sectional area that is smaller than that of the second end face 158, is exposed to the valve housing outlet port 136, and the second end face 158 is exposed to the valve housing control gas charge/discharge passage second port 154. The valve element 106 also preferably includes one or more seal grooves 155 formed in the outer peripheral surface 159. A seal 157, such as a graphite ring seal, is disposed in each of the seal grooves 155. The seal 157 contacts the valve housing inner surface 128 and prevents, or at least inhibits, leakage between the valve element first 156 and second 158 end faces.

With the above-described configuration it may thus be seen that the valve element 106 is configured to translate between the open and closed positions in response to the flow of propellant gas through the control gas supply 124, 142 and discharge 126, 144 passages, which is in turn controlled by the control valve 108. More specifically, as will be described more fully below, when propellant gas flows through the control gas supply 124, 142 and charge/discharge 126, 144 passages and into the valve housing control volume 138, the fluid pressure acting on the valve element second end face 158 moves the valve element 106 to the closed position. When the valve element 106 is in the closed position, the valve element 106 is seated on a valve seat 162 formed in the valve housing 104 and seals the valve housing inlet ports 134. As such, the valve housing inlet 134 and outlet 136 ports are not in fluid communication with one another, and propellant gas flow through the discharge nozzle 114 is prevented. Conversely, when propellant gas does not flow through the control gas supply passages 124, 142, the fluid pressure acting on the valve element first end face 156 moves the valve element 106 to the open position. When the valve element 106 is in the open position, the valve element 106 is positioned adjacent the valve housing control gas charge/discharge passage second port 154 and the valve housing inlet 134 and outlet 136 ports are in fluid communication with one another. As such, propellant gas in the propellant gas flow passageway 116 flows through the valve housing inlet ports 134, into the valve housing control volume 138, through the valve housing outlet port 136, and into and through the discharge nozzle 114.

Before proceeding further it will be appreciated that the valve housing 104 and valve element 106 may be constructed of any one of numerous materials, but in a preferred embodiment each is constructed of a refractory metal. Some examples of suitable refractory metals include rhenium, rhenium alloys, tungsten, niobium, and alloys of these or other suitable refractory metals now known or developed in the future. It will additionally be appreciated that the valve housing 104 and valve element 106 may be formed of the same or different suitable refractory metal; however, in a particular preferred embodiment, the valve housing 104 is constructed of rhenium, and the valve element is constructed of a graphite or carbon-carbon core within an outer shell of rhenium.

The control valve 108, as was noted above, is used to control the flow of propellant gas through the control gas supply 124, 142 and charge/discharge 126, 144 passages. The control valve 108 is preferably mounted on the outer vessel 102, though it will be appreciated that it could be mounted separate from the outer vessel 102. The control valve 108 may also be implemented as any one of numerous types of control valves, but in the depicted embodiment the control valve is implemented as a pilot valve and includes a gas supply port 164, a gas charge/discharge port 166, a vent port 168, an actuator 172, and a valve element 174. The control valve gas supply port 164 is in fluid communication with the propellant gas flow passageway 116 via the control gas supply passages 124, 142, the control valve gas charge/discharge port 166 is in fluid communication with the valve housing control volume 138 via the control gas charge/discharge passages 126, 144, and the vent port 168 is in fluid communication with the surrounding environment.

The actuator 172 is configured to receive valve position command signals from a non-illustrated external source such as, for example, a non-illustrated flight controller and, in response to the command signals, moves the valve element 174 between a first position and a second position. The actuator 172 may be implemented as any one of numerous types of actuators now known or developed in the future including, for example, electrical, electromechanical, pneumatic, and hydraulic. In the depicted embodiment, however, the actuator 172 is implemented as a solenoid that responds to the valve position command signals to move the valve element 174 between the first and second positions. In this regard, it will additionally be appreciated that the actuator 172 could be configured in any one of numerous ways. However, in the depicted embodiment the actuator 172 is configured such that when it is not energized the valve element 174 is moved to the first position. Conversely, when the actuator 172 is energized the valve element 174 is moved to the second position.

The control valve 108 is configured such that when it is in the first position (e.g., actuator 172 de-energized) the control valve gas supply port 164 is in fluid communication with the control valve gas charge/discharge port 166 and the vent port 168 is sealed. Conversely, when the control valve 108 is in the second position (e.g., actuator 172 energized) the control valve gas charge/discharge port 166 is in fluid communication with the vent port 168 and the control valve gas supply port 164 is sealed. Thus, when the valve element 174 is in the first position, propellant gas in the propellant gas flow passage 116 flows through the control valve 108 and into the valve housing control volume 138 via the valve housing control gas charge/discharge passage outlet port 154. As a result, propellant gas pressure acting on the valve element second end face 158 moves the valve element 106 to the closed position. Conversely, when the valve element 174 is in the second position, propellant gas in the propellant gas flow passage 116 does not flow through the control valve 108, and the valve housing control volume 138 is vented to the surrounding environment via the vent port 168. As a result, propellant gas pressure at the valve housing inlet ports 134 moves the valve element 106 to the open position.

Figure 3:
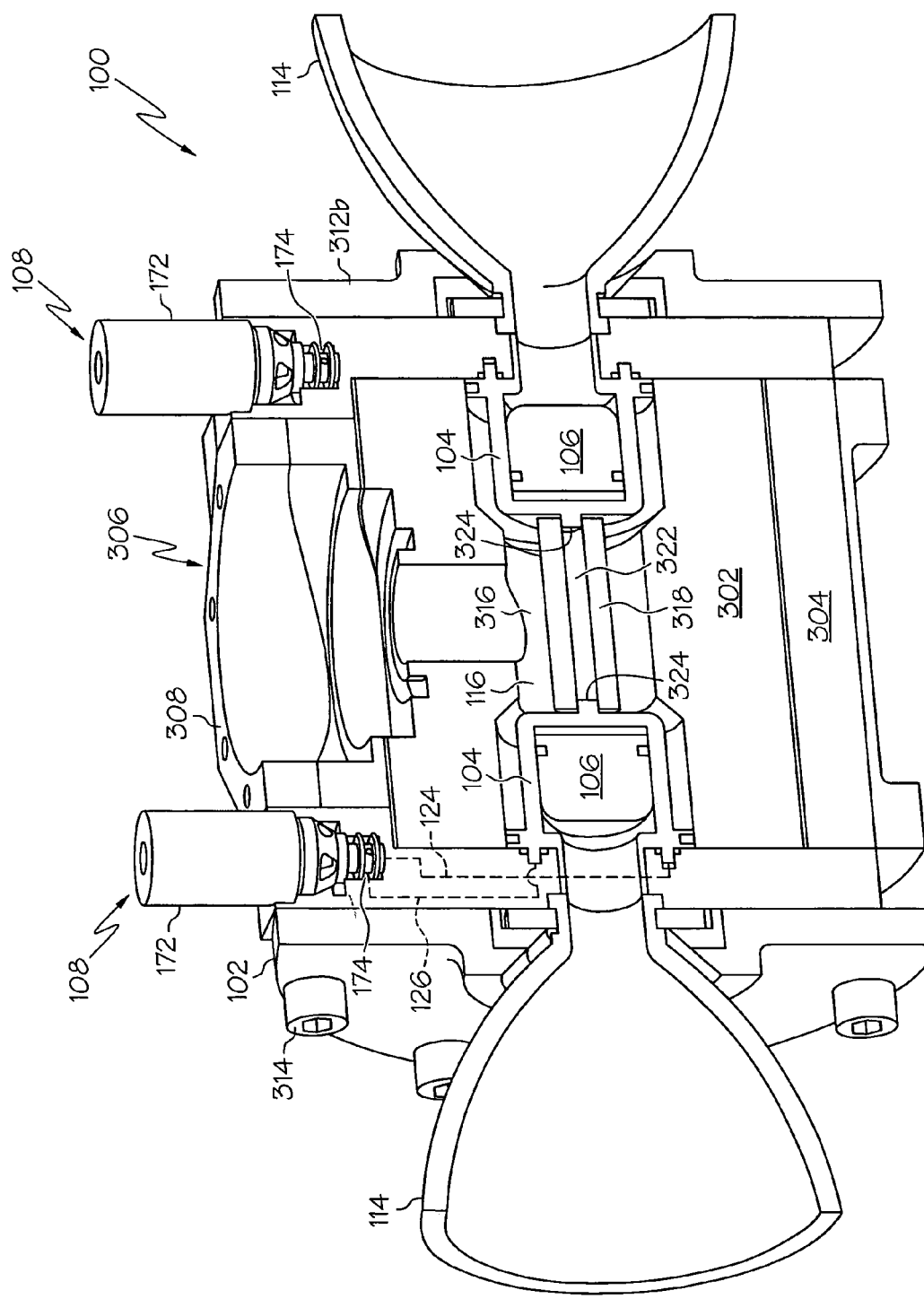
FIG. 3 is a cross section view of an exemplary physical embodiment of the valve assembly shown in FIG. 1.
Figure 4:
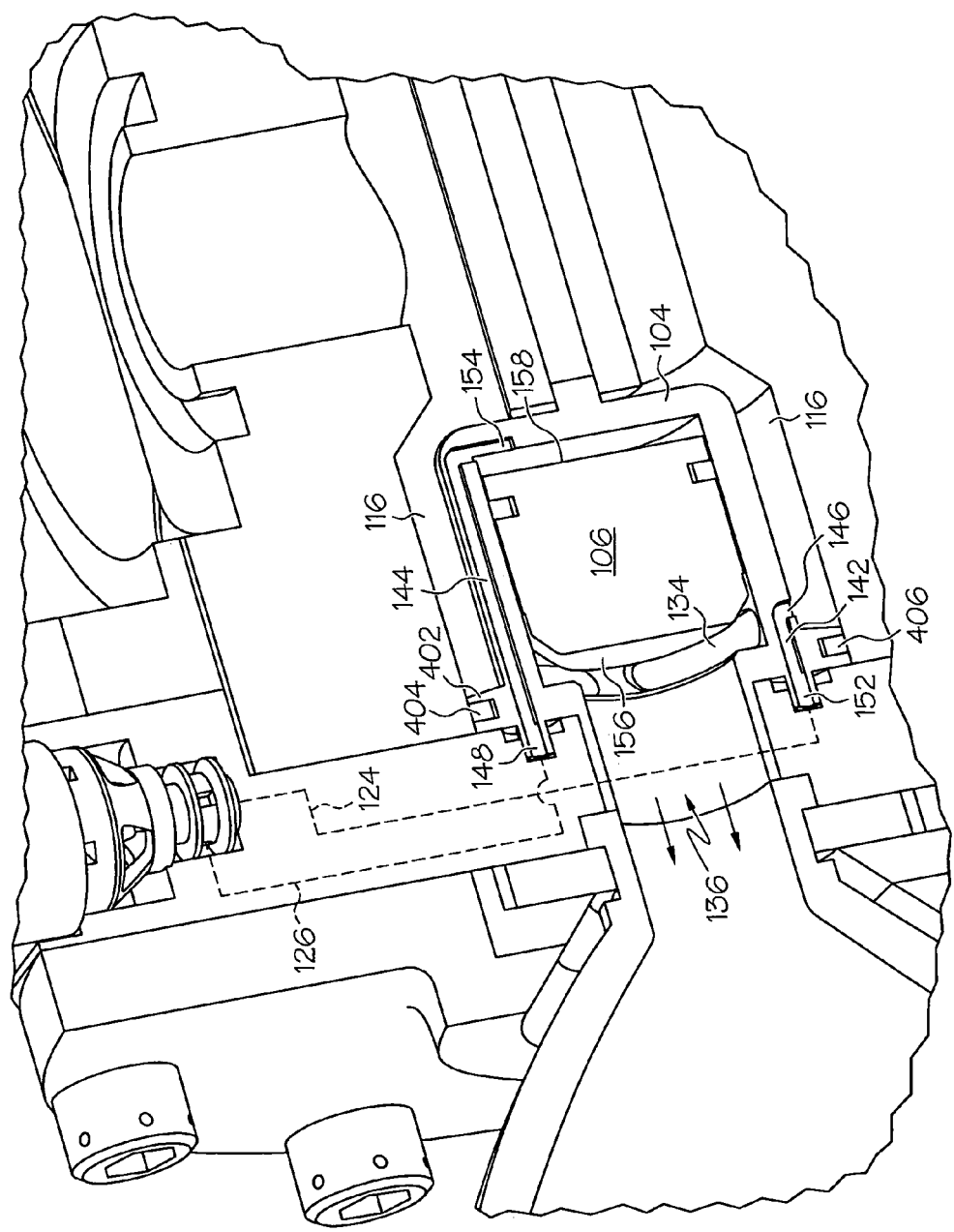
FIG. 4 is a close-up view of a portion of the exemplary valve assembly shown in FIG. 3.

It will be appreciated that the valve assembly 100 described above and depicted in simplified schematic form in FIG. 1 may be physically implemented in any one of numerous configurations. A particular physical implementation is shown in FIGS. 3 and 4 and will be briefly described. Before doing so, however, it should be understood that like reference numerals in FIGS. 1, 3, and 4 refer to like parts. As such, the physical embodiments depicted in FIGS. 3 and 4 will not be described to the same level of detail as the general embodiment depicted in FIG. 1.

Turning first to FIG. 3, it is seen that in the valve assembly 100 is configured to independently supply propellant gas to two discharge nozzles 114. It will be appreciated that this is merely exemplary, and that the valve assembly 100 could be implemented to independently supply more or less than this number of discharge nozzles 114. No matter the number of discharge nozzles 114' included, it is seen that in the depicted implementation the outer vessel 102 is constructed of three different sections, an inner section 302, an insulator section 304, and an outer section 306. The inner section 302, which is the section in which the propellant gas flow passage 116 is formed, is preferably constructed of graphite. However, it will be appreciated that this is merely exemplary and that any one of numerous other suitable high-temperature, lightweight materials that can provide adequate sealing capabilities in the presence of the propellant gas could be used. Examples of suitable alternative materials include carbon-carbon, various ceramic, and various ceramic matrix materials.

The insulator section 304 is disposed between the inner section 302 and the outer section 306. The insulator section 304 may be formed of any one of numerous suitable insulating materials such as, for example, phenolic, EPDM rubber, or ceramics such as Zirconia Oxide. Preferably, however, the insulator section 304 is formed of, or at least comprises, phenolic. The insulator section 304 thermally isolates the outer section 306, which is preferably constructed of steel or other material of suitable strength, from the relatively high temperatures that the inner section 302 may reach. In the depicted embodiment, the outer section 306 includes an outer shell 308 and two end plates 312a, 312b. A plurality of fasteners 314 extend through the end plates 312a, 312b, and compress the end plates 312a, 312b against the insulator section 304, the outer shell 308, and the inner section 302.

As FIG. 3 also shows, the outer vessel 102 is configured to couple to a non-illustrated propellant gas source 112, such as a rocket motor, and the outer shell 308, the insulator section 304, and inner section 302 each have inlet openings formed therein that are in fluid communication with a cavity 316 that is formed in the inner section 302. As was noted above, the valve assembly 100 could additionally be integrally formed as part of a rocket motor. The cavity 316, which is pressurized by the propellant gas when the valve assembly 100 is coupled to the propellant gas source 112, is in fluid communication with, and directs the propellant gas into, the propellant gas flow passages 116 that surround the valve housings 104.

The valve housings 104 are mounted within propellant gas flow passages 116 and are supported via a housing support 318 that is formed in the inner section 302. The housing support 318 is surrounded by the cavity 316 and includes a longitudinally extending opening 322. The valve housings 104 each include a support 324 that extends from the outer surface 132 and is disposed, in a substantially leak-tight manner, within the housing support opening 322. As shown more clearly in FIG. 4, the valve housings 104 further include a peripheral mount flange 402 that extends radially from the outer surface 132 and contacts the inner section 302 and the insulator section 304. Preferably, a seal groove 404 is formed in the mount flange 402, and a seal 406, such as a graphite ring seal, is disposed within the mount flange seal groove 404. The mount flange 402 and seal 406 are configured to maintain a relatively leak-tight seal between the valve housing 104 and the insulator section 304. More specifically, when pressurized propellant gas is present in the propellant gas flow passageway 116, the propellant gas pressure exerts a force on the mount flange 402, resulting in continuous contact between the mount flange 402 and the insulator section 304. This sealing arrangement significantly reduces the likelihood that the insulator section 304 will come into contact with relatively high-temperature metal and/or gas. Since the material of which the insulator section 304 is constructed can erode and/or char if contacted by high-temperature metal and/or gas, overall performance and longevity of the valve assembly 100 is improved. Even if the insulator section 304 experiences some charring and/or erosion, resulting in small material losses, these material losses are compensated for by the force acting on the mount flange 402, which causes the valve housing 104 to take up any gap that such material loss causes and keeps the force on the seal 406.

Returning once again to FIG. 3, it is seen that the control valves 108 are preferably mounted on, and extend into, the outer vessel 102. More specifically, the control valves are mounted on, and extend through, the outer shell 308, and portions of the insulator section 304. The outer vessel control gas supply 124 and discharge 126 passages, which fluidly communicate the control valves 108 with the valve housing control gas supply 142 and charge/discharge 144 passages, are formed in the insulator section 304. It will be appreciated that for clarity and ease of illustration, the outer vessel control gas supply 124 and charge/discharge 126 passages are depicted in phantom in FIGS. 3 and 4. It will additionally be appreciated that the outer vessel control gas supply 124 and charge/discharge 126 passages could be formed in other sections of the outer shell 308 in addition to, or instead of, the insulator section 304.

The physical embodiment depicted in FIGS. 3 and 4 operates substantially identical to the simplified embodiment depicted in FIG. 1. That is, when the control valve 108 is commanded to the first position (e.g., actuator 172 de-energized) the control valve gas supply port 164 is in fluid communication with the control valve gas charge/discharge port 166 and the vent port 168 is sealed (none of the ports visible in FIGS. 3 and 4). Thus, propellant gas in the propellant gas flow passage 116 flows through the control valve 108 and into the valve housing control volume 138 via the valve housing control gas charge/discharge passage second port 154. As a result, propellant gas pressure acting on the valve element second end face 158 moves the valve element 106 to the closed position. Conversely, when the control valve 108 is in the second position (e.g., actuator 172 energized) the control valve gas charge/discharge port 166 is in fluid communication with the vent port 168 and the control valve gas supply port 164 is sealed. Thus, propellant gas in the propellant gas flow passage 116 does not flow through the control valve 108, and the valve housing control volume 138 is vented to the surrounding environment. As a result, propellant gas pressure at the valve housing inlet ports 134 moves the valve element 106 to the open position.

With the above described configuration, the valve housing 104 is continuously surrounded by the pressurized propellant gas within the propellant gas flow passageway 116. As a result, the valve housing 104 experiences a net compressive force, rather than a net tension force. Moreover, during some operational configurations the valve housing 104 experiences a zero net force, or at least a relatively low compressive force. This in turn allows the thickness of the walls and various other load bearing features of the valve housing 104 to be reduced as compared to present valve housings 104 that are constructed of high-temperature materials, such as refractory metal.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A high temperature valve for controlling gas flow, comprising:

an outer vessel including at least a gas flow passageway, a control gas supply passage, and a control gas charge/discharge passage formed therein, the gas flow passageway having at least a gas flow passageway inlet port adapted to receive a flow of gas;

a valve housing disposed at least partially within, and at least partially surrounded by, the gas flow passageway, the valve housing having a control gas supply passage and a control gas charge/discharge passage formed therein and including an inner surface, an outer surface, a valve housing inlet port, and a valve housing outlet port, the valve housing inner surface defining a control volume, the valve housing control gas supply passage in fluid communication with the gas flow passageway and the outer vessel control gas supply passage, the valve housing control gas charge/discharge passage in fluid communication with the outer vessel control gas charge discharge passage and the control volume, the valve housing inlet port in fluid communication with the gas flow passageway and the control volume, the valve housing outlet port in fluid communication with the control volume;

a control valve mounted on the outer vessel and including at least a control gas supply port and a control gas charge/discharge port, the control gas supply port in fluid communication with the outer vessel control gas supply passage, the control gas charge/discharge port in fluid communication with the valve housing control gas charge/discharge passage, the control valve moveable between at least (i) a first position, in which the control gas supply port is in fluid communication with the control gas charge/discharge port, and (ii) a second position, in which the control gas supply port is not in fluid communication with the control gas charge/discharge port; and a valve element disposed within the valve housing control volume and moveable between at least (i) an open position, in which the valve housing inlet port and valve housing outlet port are in fluid communication with one another, and (ii) a closed position, in which the valve housing inlet port and valve housing outlet port are not in fluid communication with one another.

2. The valve of claim 1, wherein the valve housing comprises a refractory metal.

3. The valve of claim 1, further comprising:
an insulator at least partially surrounding at least a portion of the gas flow passageway.

4. The valve of claim 3, wherein the insulator comprises phenolic.

5. The valve of claim 1, wherein the valve element comprises a piston slidably disposed within the valve housing control volume.

6. The system of claim 5, wherein:
the piston includes at least a first face and a second face;
the piston first face is exposed to the valve housing outlet port.

7. The valve of claim 1, wherein:
the piston includes at least a first face and a second face;
the piston first face is exposed to the valve housing outlet port; and
when the propellant gas is supplied to the propellant gas flow passageway, the second face has a fluid force exerted thereon when the control valve is in the first position.

8. The valve of claim 1, further comprising:
a mount flange extending radially from the valve housing, the mount flange extending at least partially across the propellant gas flow passage and having a seal groove formed therein; and
a seal disposed within the mount flange seal groove, the seal coupled to the outer vessel and configured to at least inhibit propellant gas from flowing between the seal and the outer vessel.

9. The valve of claim 1, wherein the outer vessel comprises:
an inner section having the propellant gas flow passageway formed therein;
an insulator section at least partially surrounding at least a portion of the inner section; and
an outer vessel at least partially surrounding at least a portion of the insulator section.

10. The valve of claim 9, wherein:
the inner section comprises graphite;
the insulator comprises phenolic; and
the outer section comprises a metal.

* * * * *